R. J. ELLIS.
CUTTING AND FINISHING MACHINE.
APPLICATION FILED JUNE 29, 1918.

1,372,679.

Patented Mar. 29, 1921.
3 SHEETS—SHEET 1.

WITNESS:
Dominic P. Cone.
Ralph Munden

INVENTOR.
Roy J. Ellis.
BY
Raymond H. Von West
ATTORNEY.

UNITED STATES PATENT OFFICE.

ROY J. ELLIS, OF NIAGARA FALLS, NEW YORK, ASSIGNOR TO U. S. LIGHT & HEAT CORPORATION, OF NIAGARA FALLS, NEW YORK, A CORPORATION OF NEW YORK.

CUTTING AND FINISHING MACHINE.

1,372,679.

Specification of Letters Patent. Patented Mar. 29, 1921.

Application filed June 29, 1918. Serial No. 242,587.

*To all whom it may concern:*

Be it known that I, ROY J. ELLIS, a citizen of the United States, residing at Niagara Falls, in the county of Niagara and State of New York, have invented new and useful Improvements in Cutting and Finishing Machines, of which the following is a specification.

The present invention relates to cutting and finishing machines.

More particularly the present invention relates to machines for cutting members to a required size and finishing the edges thereof. The present invention is illustrated as applied to bushings. These are often made by casting, which process leaves a gate which must be cut off. After the gate has been removed, the rough edges left by the cutting tool must be smoothed off.

Expressed in its simplest terms, the present invention comprises means whereby members may be fed in succession to a cutting means, after which each will have a finishing operation performed thereon. During the finishing operation the members will be held stationary.

An object of the present invention is to provide means for cutting and finishing members, which will be automatic in operation, requiring an operator only to feed the members to said machine.

A further object is to provide a machine of the kind above referred to which will be sturdy in construction and which will provide the different speeds of rotation necessary for the cutting and finishing operations.

Further objects will appear as the description proceeds.

Referring to the drawings:

Figs. 4 and 5 are views in plan and sectional elevation of the cutting and finishing tools.

Figure 1:
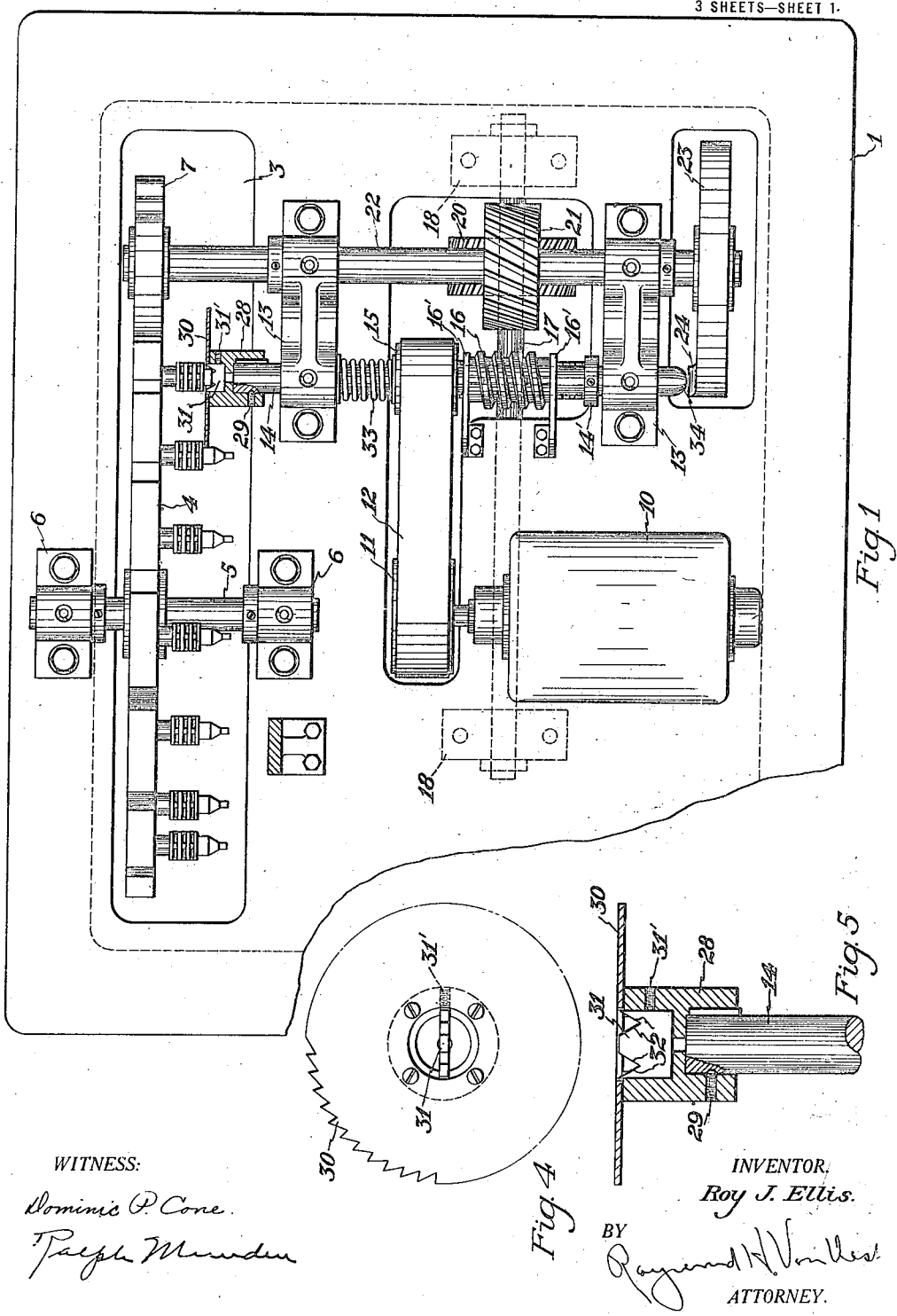
Figure 1 is a plan view illustrating one embodiment of the present invention.

Briefly, the illustrated embodiment of the present invention comprises means including a Geneva gear, one element of which carries the members which are to be operated upon. Said element provides an intermittent motion, whereby said element will rotate through a part of a revolution and will be held stationary for a part of a revolution. Said element is provided with a plurality of supporting means for carrying the members to be operated upon. During the periods of motion, a suitable cutting tool will remove material which is to be cut off. During the periods when said element is held stationary, another tool will operate to remove the rough edges. Suitable transmitting means will be provided for giving said tools the proper rotative speed.

The numeral 1 indicates a table which may be mounted upon legs 2, 2. Located within a hole 3 of said table 1 is a gear 4 which constitutes one element of the Geneva gear. Said gear is mounted upon a shaft 5 which is supported within bearings 6, 6. The gear 4 is driven by the pinion 7 which constitutes the complementary element of the Geneva gear. The gear 4 is provided on its periphery with a plurality of notches 8, 8. Between said notches the gear 4 is provided with cupped portions 8', 8', which conform to the outline of the pinion 7. The pinion 7 is provided with a single tooth 9 adapted to engage in the notches 8, 8, whereby to provide the gear 4 with a movement of rotation. At such times that the tooth 9 is not in engagement with the notch 8, the round portion of the pinion 7 will engage with a cup-shaped portion 8' of the gear 4, thereby holding said gear 4 stationary.

A motor 10 will be provided for driving the pinion 7 and for driving the cutting and finishing tools which will be referred to hereinafter. The motor 10 is provided with a pulley 11 which is adapted to drive a belt 12.

Mounted within bearings 13, 13, is a shaft 14. Said shaft 14 should be capable of longitudinal movement as well as rotary movement within said bearings 13, 13. Said shaft 14 is provided with a pulley 15 fast thereon, by means of which a movement of rotation is communicated to the shaft 14 by the belt 12.

Mounted upon the shaft 14 to have a movement of rotation therewith is a worm 16. Said worm 16 should be held against longitudinal movement, as by the lugs 16', but should permit longitudinal movement of the shaft therethrough. For the latter purpose the worm 16 may be keyed to the shaft 14. For the purpose of limiting the movement of the shaft 14 in a direction away from the member 4, said shaft may be provided with a collar 14' which may be adjustably mounted thereon and which is adapted to abut against one of the bearings 13.

Mounted upon the underneath side of the table 1 is a shaft 17 rotating in bearings 18, 18. Said shaft 17 has rigidly mounted thereon a worm wheel 19 by means of which a movement of rotation is communicated from the worm 16 to the shaft 17. The shaft 17 has also rigidly mounted thereon a spiral gear 20 which is adapted to mesh with a coöperating spiral gear 21. The spiral gear 21 is mounted on a shaft 22 which may rotate within the bearings 13, 13 and which carries the pinion 7 of the Geneva gear. Also mounted upon the shaft 22 is a cam wheel 23 which is provided with a projecting portion 24, the purpose of which will be described hereinafter.

Projecting from one side of the gear 4 are a plurality of spaced studs 25 which are provided with shoulders 26. Said studs 25 are adapted to carry the members 27 which are to be operated upon. The members 27 are represented as bushings with gates thereon which are left when said bushings come from the mold. The shoulders 26 form abutments for the bushings.

The shaft 14 has mounted thereon a tool carrier 28. Said tool carrier 28 may be keyed to the shaft 14 and may be held against longitudinal movement by a set screw 29. The tool carrier 28 carries a saw 30 and also carries a finishing tool 31 which may be held in place by means of a set screw 31'. The details of the tool carrier, together with the tools thereon, are illustrated in Figs. 4 and 5. The saw 30 may be secured to the tool carrier 28 by any convenient means, as for instance, screws. The finishing tool 31 may rest in a slot in the tool carrier 28. As the finishing tool 31 wears away in use, shims may be provided for holding said finishing tool in its proper position. The finishing tool 31 is provided with a plurality of cutting surfaces 32, 32, whereby to finish the inside and outside of the bushing edges 27 at a single operation.

A spring 33 is provided for urging the shaft 14 in a direction away from the member 4. As illustrated in Fig. 1, the spring 33 lies in a state of compression between one of the bearings 13 and the pulley 15, whereby to bias the shaft 14. The shaft 14 is provided with a rounded end 34 adapted to coöperate with the projection 24 on the cam wheel 23, whereby, when the cam wheel is turned into such a position that the projection 24 comes into alinement with the shaft 14, said projection 24 will engage the end 34 of said shaft 14 to move said shaft, together with the tools 30 and 31, toward the gear 4.

Figure 3:
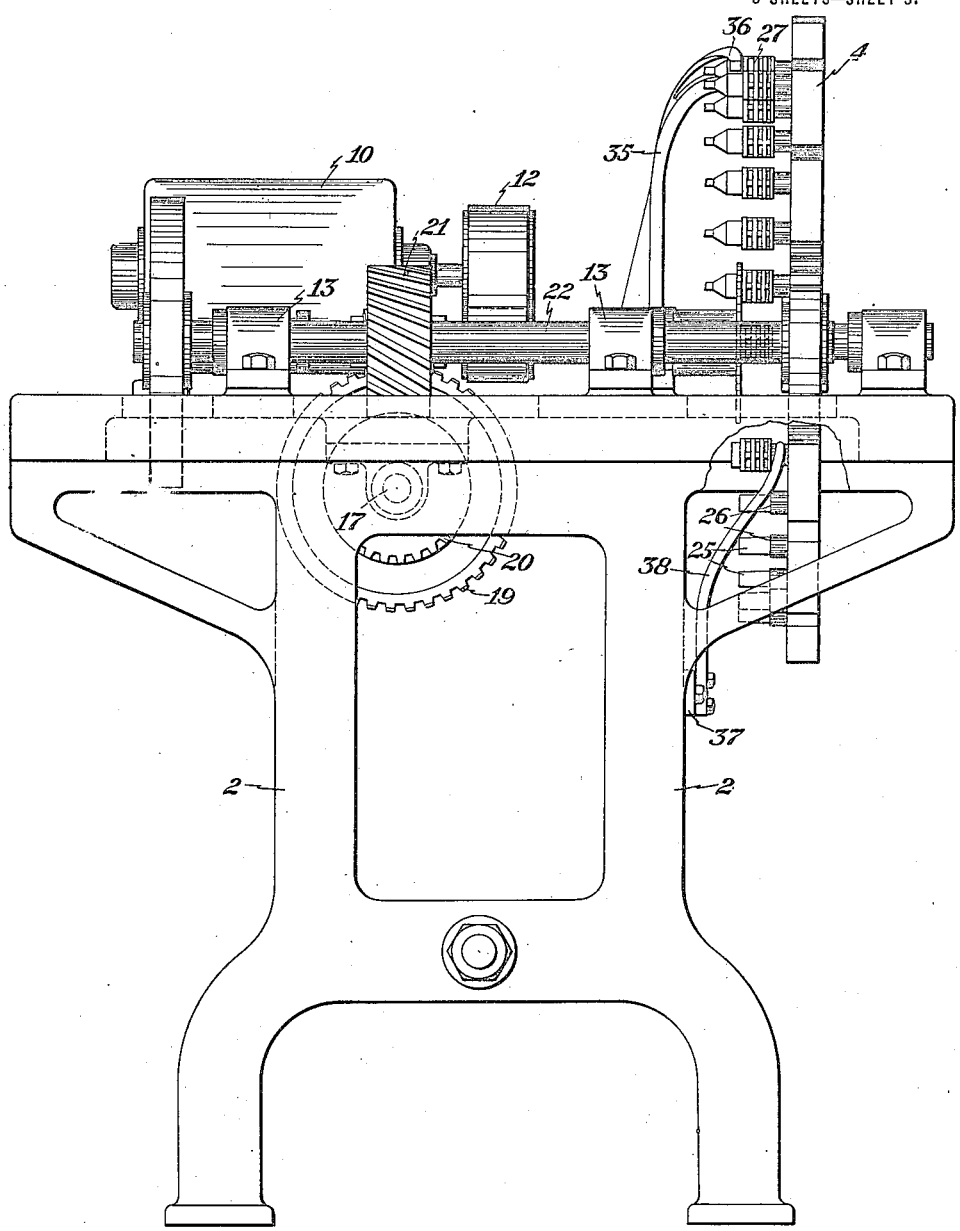
Fig. 3 is an end elevation.

Suitably mounted upon the table 1 is a fork-shaped member 35 provided with a pair of prongs 36, 36. Said prongs 36, 36, provide between them a space 36'. The sides of the prongs 36, 36 which form the space 36' should lie substantially in diameters having the axis of the shaft 5 as a center. Said prongs 36, 36 should be resilient and should occupy an angular position relative to the gear 4, whereby as the bushings are moved in a clockwise direction, said prongs 36, 36 will move said bushings into firm engagement with the shoulders 26, 26. As the bushings 27 are moved in a clockwise direction, they will ride between the prongs 36, 36 without interference, due to the angular position of said prongs 36, 36 relative to the gear 4. Said position is best illustrated in Fig. 3.

Mounted between the lugs 2, 2 is a cross-bar 37 upon which is mounted a removing tool 38. Said tool 38 is provided with a pair of prongs 39, providing between them a space 40. The outlines of the prongs 39, 39 which provide the space 40 should also lie substantially in diameters having the axis of the shaft 5 as a center and should be angularly placed relative to the gear 4. As the bushings 27 are moved in a clockwise direction, the prongs 39, 39 will engage the under side of said bushings and will remove said bushings from the studs 25, 25 in succession. Owing to the angular relation between the prongs 39, 39 and the gear 4, there will be no interference between the prongs 39, 39 and the studs 25.

Figure 2:
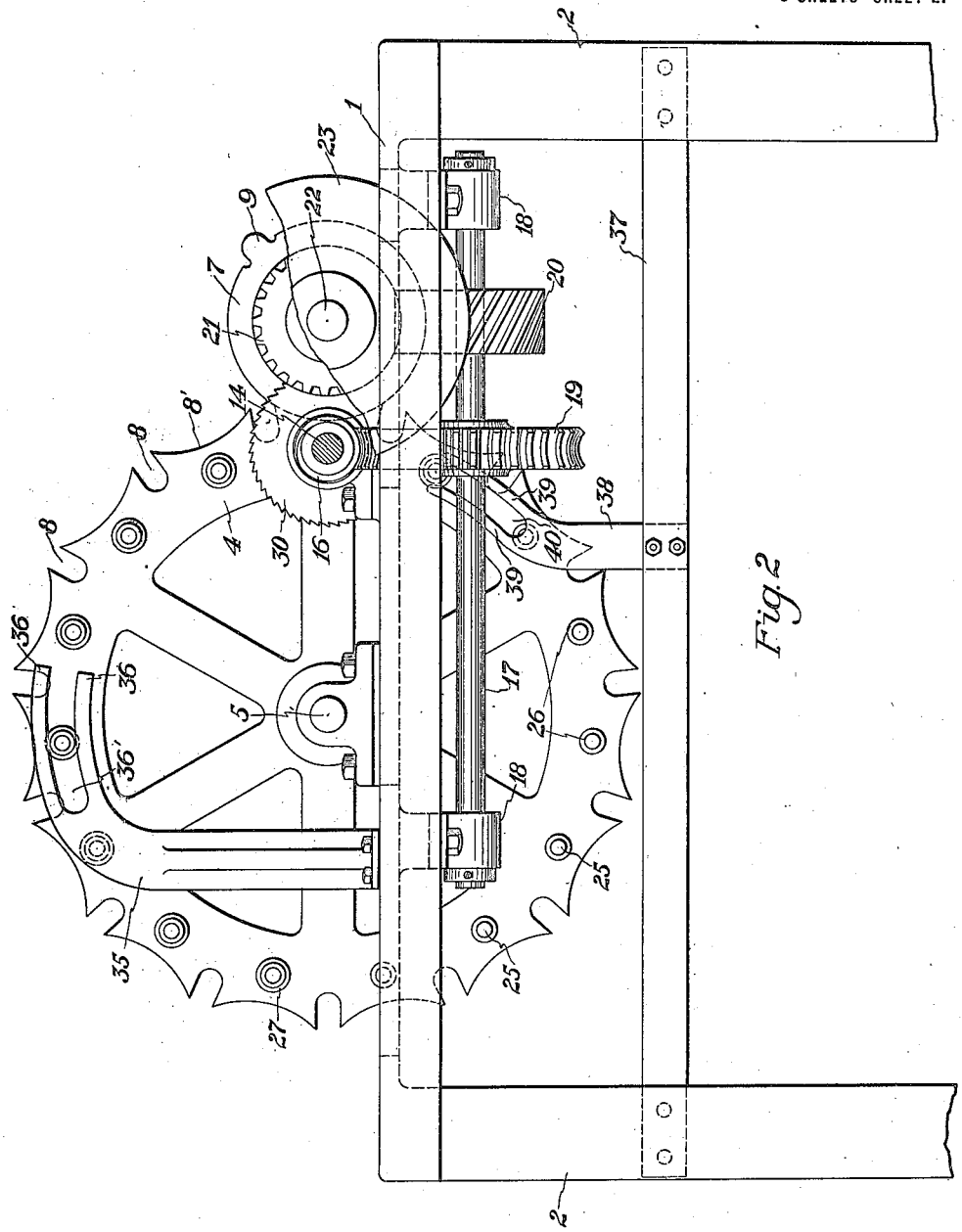
Fig. 2 is a side view in elevation.

In operation the motor 10 will drive the belt 12 to communicate a movement of rotation to the shaft 14 at a relatively high speed. Motion from the shaft 14 will be communicated through the worm 16, worm wheel 19, shaft 17, spiral gear 20, spiral gear 21 to shaft 22. The shaft 22 will drive the pinion 7 of the Geneva gear. The pinion 7 of the Geneva gear will operate in a manner well understood to drive the gear 4 with an intermittent stop motion. Assuming that the motor 10 operates in such direction as to cause the gear 4 to rotate in a clock-wise direction as viewed in Fig. 2, it will be clear that an operator may place bushings upon studs 25, 25 as they come up to the left hand side of the member 35 as viewed in Fig. 2. Movement of the bushings 27 in a clock-wise direction will cause them to engage with the prongs 36, 36 whereby said bushings will be moved into firm engagement with the shoulders 26 on the studs 25. The saw 30 will be located in position to saw off the gates of the bushings 27 at the proper points. When each of the studs 25, 25 has been moved in a position in alinement with the shaft 14, the smooth portion of the pinion 7 will have come in contact with the cupped portion of the gear 4 whereby to hold the gear 4 stationary. At the same time, the cam wheel 23 will have been moved into a such a position that the projection 24 will engage the end 34 of the shaft 14, moving said shaft longitudinally. The longitudinal movement of the shaft 14, together with the movement of rotation, will cause the finishing tool 31 to smooth off the rough edges of the bushings left after the cutting operation. As the bushings come into contact with the removing tool 38, the prongs 39, 39 of said removing tool will remove the bushings from the studs, whence said bushings may fall into a suitable receptacle. It will be clear that the gear 4 will be held stationary while each finishing operation is being performed. After said finishing operation is performed, the spring 33 will cause the withdrawal of the finishing tool and the next bushing will be moved against the saw 30. It will be clear that the machine will operate continuously with alternate periods wherein the gear 4 will rotate and will be held stationary. A minimum of discretion will be required on the part of the operator, the bare engagement of the bushings 27 with the studs 25 being all that is required.

Though the present invention has been described in connection with bushings, it will be clear that the member operated upon may be any other element. It will also be clear that mechanisms other than a Geneva gear may be utilized to provide an intermittent motion to the gear 4. The invention is capable of a variety of modifications as to details, which modifications will not depart from the spirit of the invention. It is intended in this patent to cover all such modifications that fall within the scope of the appended claims.

What I claim as new and desire to secure by Letters Patent of the United States is—

1. In a cutting and finishing machine, in combination, carrying means having alternate periods of motion and rest, cutting means operative during said periods of motion, finishing means operative during said periods of rest, and a common spindle for carrying said cutting means and said finishing means.

2. In combination, a rotatable member having a plurality of spaced supporting means, said member being capable of moving said means in a circular path while maintaining their axes at all times parallel to one line, means for applying members to said supporting means comprising a pair of prongs angularly placed relative to the line of movement of said supporting means, and means for removing members from said supporting means comprising a pair of prongs angularly placed relative to the line of movement of said holding means.

3. In a cutting and finishing machine, in combination, means having alternate periods of motion and rest for carrying members to be machined, means for moving said carrying means and holding same stationary, a shaft carrying a saw and a burr removing tool, said saw and said tool being concentrically mounted and means operating synchronously with said moving and holding means for applying said saw and said tool to said members in succession.

4. In a cutting and finishing machine, in combination, means having alternate periods of motion and rest for carrying members to be machined, a tool holder carrying a saw and finishing tool, said saw being positioned to operate on said members in succession during said periods of motion, and means for applying said finishing tool to said members in succession during said periods of rest.

5. In a cutting and finishing machine, in combination, means having alternate periods of motion and rest for carrying members to be machined, a finishing tool, a circular saw concentric with said finishing tool, means for supporting said tool and saw, and means for reciprocating said supporting means.

6. In a cutting and finishing machine, in combination, means having alternate periods of motion and rest for carrying members to be machined, means for moving said carrying means and for holding same stationary, a finishing tool, a circular saw concentric with said finishing tool, means for supporting said tool and saw, and means operating synchronously with said moving and holding means for reciprocating said supporting means.

7. In a cutting and finishing machine, in combination, means having alternate periods of motion and rest for carrying members to be machined, a pair of parallel shafts, means for driving said shafts at different speeds, one of said shafts being longitudinally reciprocal and carrying a saw and a finishing tool, the other of said shafts being provided with means for moving said carrying means and holding same stationary, said other shaft being also provided with means for reciprocating said one shaft.

8. In a cutting and finishing machine, in combination, carrying means provided with a plurality of supporting means, a longitudinally reciprocable shaft, means for rotating said shaft, and means for moving said supporting means intermittently and successively to a position in alinement with said reciprocable shaft, said reciprocable shaft being provided with a pair of tools, one of which is operative while each of said supporting means is approaching alinement with said reciprocable shaft, the other of which is operative while a supporting means is in alinement with said reciprocable shaft.

9. In a cutting and finishing machine, in combination, carrying means provided with a plurality of supporting means, a longitudinally reciprocable shaft, means for rotating said shaft, and means for moving said supporting means successively to a position in alinement with said shaft and for holding said supporting means in said position during a predetermined period of operation, said reciprocable shaft being provided with a pair of tools, one of which is operative while each of said supporting means is approaching alinement with said reciprocable shaft, the other of which is operative while a supporting means is in alinement with said reciprocable shaft.

10. In a cutting and finishing machine, in combination, carrying means provided with a plurality of supporting means, a longitudinally reciprocable shaft, means for rotating said shaft, means for moving said supporting means successively to a position in alinement with said shaft, driving means for said carrying means, and means operating synchronously with said driving means for reciprocating said shaft, said reciprocable shaft being provided with a pair of tools, one of which is operative while each of said supporting means is approaching alinement with said reciprocable shaft, the other of which is operative while a supporting means is in alinement with said reciprocable shaft.

11. In a cutting and finishing machine, in combination, carrying means provided with a plurality of supporting means, a shaft provided with a finishing tool on the edge thereof and with a circular saw, means for rotating said shaft and for moving same longitudinally, means for moving said carrying means with a step by step movement and for securely holding same stationary between steps with a supporting means in alinement with said shaft, and means operating synchronously with said driving means for reciprocating said shaft.

In witness whereof, I have hereunto subscribed my name.

ROY J. ELLIS.